United States Patent [19]
Lancaster

[11] Patent Number: 5,474,205
[45] Date of Patent: Dec. 12, 1995

[54] TANK BOTTOM AND TANK TOP

[75] Inventor: Ronald G. Lancaster, Springfield, Mo.

[73] Assignee: Custom Metalcraft, Inc., Springfield, Mo.

[21] Appl. No.: 236,083

[22] Filed: May 2, 1994

Related U.S. Application Data

[62] Division of Ser. No. 26,690, Mar. 4, 1993, Pat. No. 5,331,873, which is a division of Ser. No. 863,721, Apr. 3, 1992, Pat. No. 5,287,717.

[51] Int. Cl.⁶ ................................. B65D 87/00
[52] U.S. Cl. .................... 220/571; 220/669; 220/612
[58] Field of Search ................... 220/571, 612, 220/669

[56] References Cited

U.S. PATENT DOCUMENTS

| | | |
|---|---|---|
| 1,235,438 | 7/1917 | Chynoweth . |
| 1,430,000 | 9/1922 | Bell . |
| 2,180,185 | 11/1939 | Weiss . |
| 2,339,303 | 1/1944 | Tillery . |
| 2,685,857 | 8/1954 | Kuhn ........................ 220/612 |
| 2,733,060 | 1/1956 | Taylor ....................... 220/612 |
| 3,096,900 | 7/1963 | Breneman . |
| 3,186,607 | 6/1965 | Lubenow . |
| 3,279,640 | 10/1966 | Dodson ...................... 220/612 |
| 3,288,342 | 11/1966 | Tinker ....................... 220/612 |
| 4,417,667 | 11/1983 | Roth ......................... 220/612 |
| 4,556,151 | 12/1985 | Taira et al. ................. 220/612 |
| 4,557,406 | 12/1985 | Olinger et al. . |
| 4,648,521 | 3/1987 | Thomas et al. . |
| 4,785,958 | 11/1988 | Snyder ..................... 220/DIG. 6 |
| 4,840,284 | 6/1989 | Snyder . |

*Primary Examiner*—Joseph M. Moy
*Attorney, Agent, or Firm*—Nies, Kurz, Bergert & Tamburro

[57] ABSTRACT

An improved tank configuration wherein a die is employed to stamp a formed member is disclosed. The formed member may be used as either the top or bottom head for a portable liquid container, and is constructed so that all welding is eliminated in the corner and outlet portions of the container. A trim machine is employed to remove uneven edges from the formed part. By the present invention, a stamped configuration is provided in which a draw formed tank bottom is formed so as to allow complete and full drainage of the tank bottom. The top and bottom heads are finish trimmed to exact dimensions so as to facilitate the assembly of these parts to the shell of the tank.

2 Claims, 2 Drawing Sheets

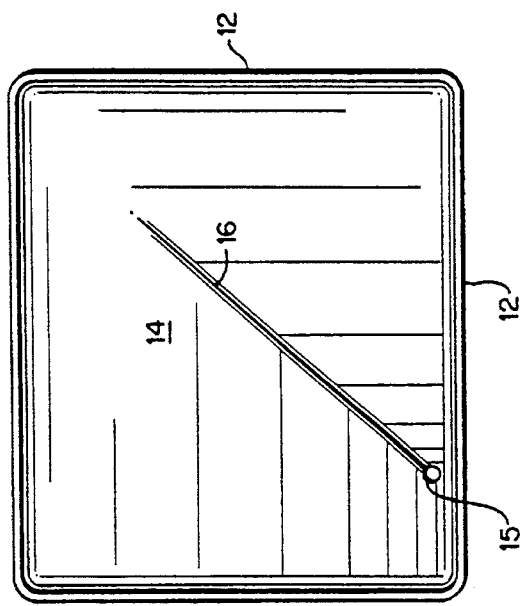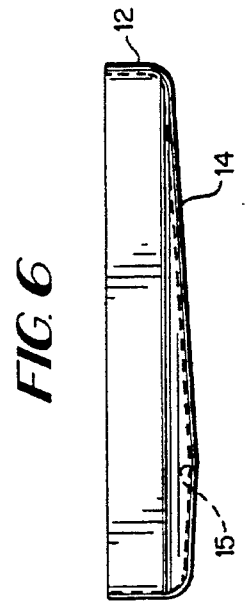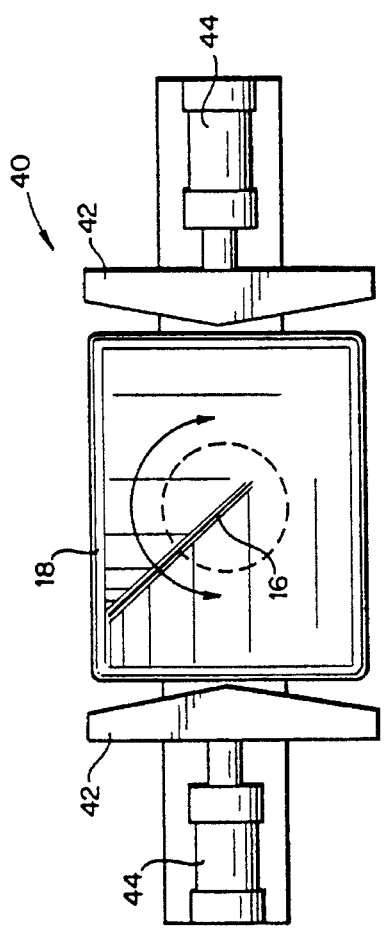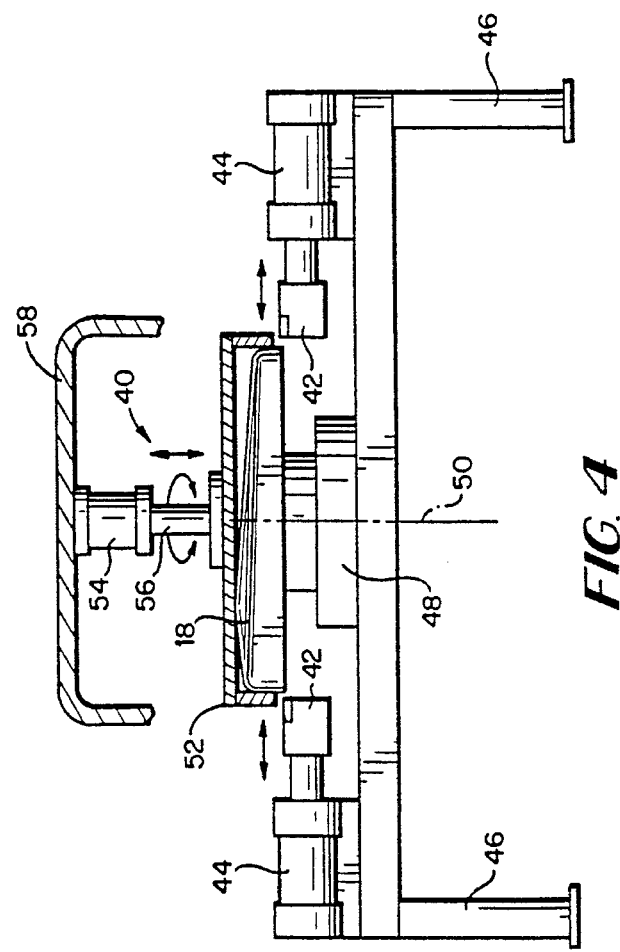

TANK BOTTOM AND TANK TOP

This is a division of application Ser. No. 026,690 filed Mar. 4, 1993 now U.S. Pat. No. 5,331,873 which is a division of application Ser. No. 863,721 filed Apr. 3, 1992, now U.S. Pat. No. 5,287,717.

BACKGROUND AND SUMMARY OF THE INVENTION

The present invention relates to a portable tank having an improved bottom and top configuration. More particularly, the present invention relates to a stamped-sloped configuration for the bottom or top of a portable tank having improved features with regard to manufacture and use of the tank.

Previous portable tank configurations are described, for example, in the following U.S. Pat. Nos.: 1,235,438 to Chynoweth; 1,430,000 to Bell; 2,180,185 to Weiss; 2,339,303 to Tillery; 3,096,900 to Breneman; 3,186,607 to Lubenow; 4,648,521 to Thomas et al; 4,840,284 to Snyder; 4,557,406 to Olinger et al; and 4,785,958 to Snyder.

By the present invention, there is provided an improved tank configuration with regard to the bottom and top portions thereof, wherein a die is employed to stamp a formed member which may be employed as either the top or the bottom head for a portable container, and which is constructed so that all welding is eliminated in the corner and outlet portions of the container A trim machine is employed to remove uneven edges from the formed part.

Accordingly, it is an object of the present invention to provide a stamped configuration in which a draw formed tank bottom is formed so as to allow complete and full drainage of the tank bottom.

It is another object of the invention to provide an improved tank bottom and top configuration in which all welded corner inserts are eliminated.

It is a further object of the invention to allow the top and bottom heads of a portable container to be finish trimmed to exact dimensions so as to facilitate the assembly of these parts to the shell of the tank.

BRIEF DESCRIPTION OF THE DRAWINGS

FIG. 3 is a plan view of a trim machine for use in trimming the edges of the formed head.

FIG. 4 is a side elevation of the trim machine of FIG. 3.

FIG. 5 is a plan view showing the draw formed head of the present invention.

FIG. 6 is a side elevation of the draw formed head of FIG. 5.

DESCRIPTION OF THE PREFERRED EMBODIMENTS

In the embodiment of the invention as shown in FIGS. 1 through 6, there is provided a tank bottom or tank top 10 having side wall portions 12 and a bottom portion 14. A single upward crease 16 is employed to stiffen the bottom when such a bottom is required. The crease 16 is not required on all bottoms and is optional in the present invention.

Figure 1:
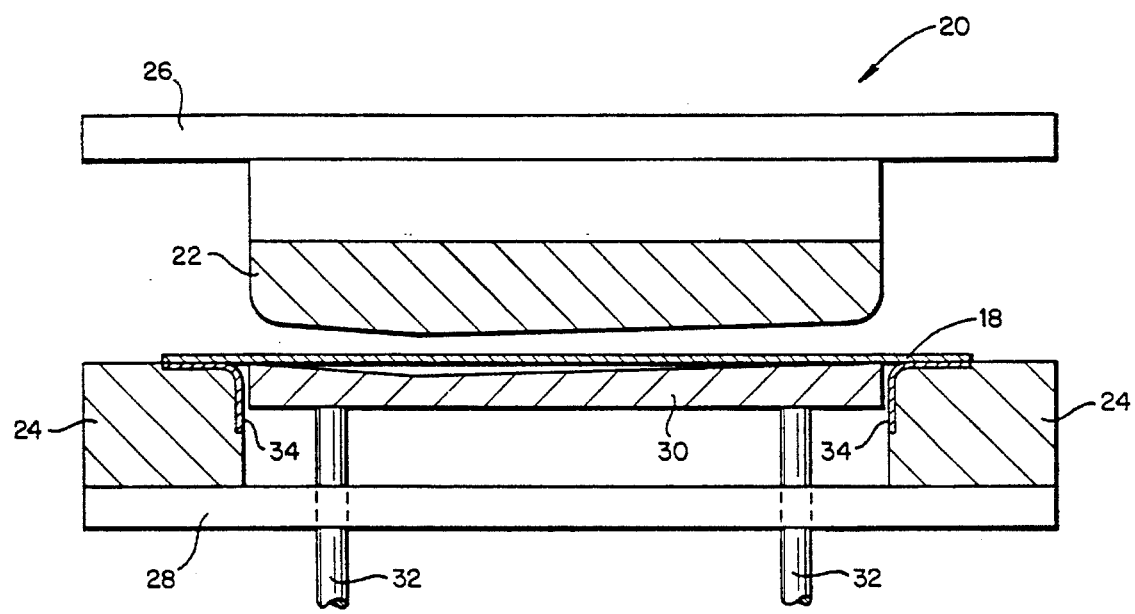
FIG. 1 is a side elevation showing the unformed top or bottom head of a container as a flat sheet positioned in the head forming die which is in the open position.

The tank bottom or top 10 is formed initially from a flat, generally rectangular sheet 18 of metal or similar material as shown in FIG. 1, with the sheet 18 being positioned in a head forming die 20 having punch 22 and die 24 members. In preparing the flat sheet 18 for the form die 20, the corners of the sheet 18 are trimmed off along a line which is approximately equal to the diameter of the curved corners of the finished tank bottom or top 10. Such initial trimming of the sheet 18 assists in producing smooth pan-shaped corner surfaces for the formed piece.

A top die shoe 26 and bottom die shoe 28 extend across the upper and lower portions of the head forming die 20 and a cushion back-up 30 with attached cushion pins 32 serve to support the sheet 18 during the forming steps. The cushion back-up 30 is of a concave configuration in its upper surface to mate with the eventual downwardly convex shape of the formed head adjacent to the drain opening 15.

Along the inner side surfaces of the die 24 are located insert members 34 which serve to prevent undue stretching, tearing or galling of the sheet material 18 while the material 18 is being drawn through the die 20. The insert members 34 are formed of bronze or similar material.

Figure 2:
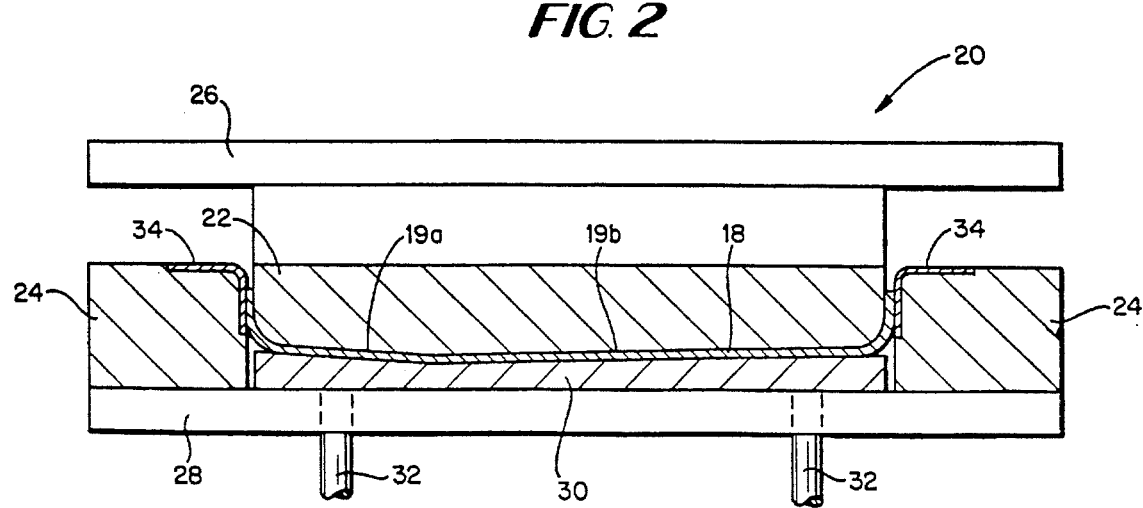
FIG. 2 is a side elevation similar to FIG. 1, showing the head which has now been formed, with the head forming die in the closed position.

Upon being formed as shown in FIG. 2, a cross section of the formed sheet 18 shows the two downwardly sloping surfaces 19a and 19b which intersect in the region adjacent the drain opening 15 which is subsequently formed in the tank bottom, as shown in FIGS. 5 and 6. The optional upward crease 16 may be formed in the sheet material 18 by suitable provision in the forming die 20. The upward crease 16 serves to stiffen the bottom 14 rather than to assist with drainage. Thus the crease 16 helps to prevent sag when the container is filled with liquid. The crease 16 extends from the drain opening 15 generally toward the center of the bottom portion 14. The specific location of the drain opening 15, which determines the dimensions 19a and 19b, may be varied depending on the intended use of the specific container. In general, however, the bottom surface 14 will be smoothly contoured upwardly toward the side walls 12 from the region of the drain opening 15. In one embodiment of the invention, the side walls 12 were approximately 2½ inches in height and the drain opening 15 was approximately ½ inch lower than the side walls 12.

After being formed in the die 20, the material 18 is next transferred manually or by other means to the trim machine 40 of FIGS. 3 and 4. The trim machine 40 includes a pair of reciprocating shear blades 42 operated by piston and cylinder members 44 mounted on a platform 46. The formed sheet 18 is mounted on a pedestal 48 having the capability by the use of conventional equipment to rotate the formed sheet 18 by 90 degrees in either direction about its vertical axis 50.

A clamp frame 52 is mounted on a part clamp cylinder 54 and piston 56 arrangement for use in holding the formed sheet 18 during the trim operation. The cylinder 54 is fixed to a frame member 58 of the trim machine 40. The clamp frame 52 is free to rotate in conjunction with the piston 56 and thus the frame 52 will rotate with the formed sheet 18 on the pedestal 48.

The trim machine 40 operates to remove uneven edges from the formed upper side walls 12 of the sheet 18 to facilitate the merging and assembly of these side wall portions 12 with the main side walls of the tank or container.

By constructing the present invention with a one piece bottom or top configuration in a die and with final trimming of the bottom or top prior to assembly to the shell of the tank, it is seen that no notch is required for slope drainage and the creasing of the tank bottom is also not required.

When the formed piece is to be employed as a tank bottom, supporting legs may be mounted on the underside of the formed tank; bottom at the four corners thereof in a conventional manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A portable tank for liquids, said tank having generally upwardly extending sides and a sloped bottom for complete drainage of liquid from the tank, wherein said sloped bottom comprises a one-piece construction formed from a generally flat, rectangular plate member, said bottom including a bottom wall portion and upwardly extending side wall portions which extend continuously around the periphery of said bottom wall portion, said bottom wall portion having an upward crease and a drain opening therein; a pair of downwardly sloping surfaces in said bottom wall portion which slope downwardly from the side wall portions of said bottom and which intersect in a region adjacent said drain opening to establish said crease so as to extend radially in a direction from said drain opening in an upward fashion toward said side wall portions; said bottom wall portion being generally contoured smoothly and continuously upwardly to the side wall portions from the entire circumference of the drain opening; and at least one rounded corner portion formed from a trimmed corner of said plate member wherein the plate member is trimmed along a line which is approximately equal to the diameter of a finished curved corner of said bottom, whereby said bottom is formed without welding in the region adjacent said drain opening or in said corner portion.

2. The portable tank of claim 1 wherein said crease extends in a direction generally between said drain opening and the center of said bottom wall portion.

* * * * *